| (12) United States Patent | (10) Patent No.: US 8,987,128 B2 |
|---|---|
| Rashed et al. | (45) Date of Patent: Mar. 24, 2015 |

(54) CROSS-COUPLING BASED DESIGN USING DIFFUSION CONTACT STRUCTURES

(75) Inventors: Mahbub Rashed, Santa Clara, CA (US); Marc Tarabbia, Pleasant Valley, NY (US); Chinh Nguyen, Austin, TX (US); David Doman, Austin, TX (US); Juhan Kim, Santa Clara, CA (US); Xiang Qi, San Jose, CA (US); Suresh Venkatesan, Danbury, CT (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 443 days.

(21) Appl. No.: 13/561,932

(22) Filed: Jul. 30, 2012

(65) Prior Publication Data

US 2014/0027918 A1    Jan. 30, 2014

(51) Int. Cl.
| H01L 21/44 | (2006.01) |
| H01L 23/48 | (2006.01) |
| H01L 23/52 | (2006.01) |
| H01L 29/40 | (2006.01) |
| G06F 17/50 | (2006.01) |
| H01L 21/768 | (2006.01) |
| H01L 27/02 | (2006.01) |
| H01L 27/118 | (2006.01) |

(52) U.S. Cl.
CPC ...... *H01L 27/11807* (2013.01); *G06F 17/5068* (2013.01); *G06F 2217/12* (2013.01); *H01L 21/76895* (2013.01); *H01L 27/0207* (2013.01); *H01L 2027/11861* (2013.01); *H01L 2027/11874* (2013.01)
USPC ... 438/599; 257/773; 257/E21.59; 257/E23.168

(58) Field of Classification Search
CPC .. H01L 21/768; H01L 23/535; H01L 23/5381
USPC .............. 438/599; 257/773, E21.59, E23.168
See application file for complete search history.

(56) References Cited

U.S. PATENT DOCUMENTS

| 8,679,911 B2* | 3/2014 | Wang et al. ................... 438/233 |
| 8,741,763 B2* | 6/2014 | Ma et al. ........................ 438/599 |
| 2014/0131816 A1* | 5/2014 | Wang et al. ................... 257/401 |

* cited by examiner

*Primary Examiner* — David S Blum
(74) *Attorney, Agent, or Firm* — Ditthavong & Steiner, P.C.

(57) ABSTRACT

An approach for providing cross-coupling-based designs using diffusion contact structures is disclosed. Embodiments include providing first and second gate structures over a substrate; providing a first gate cut region across the first gate structure, and a second gate cut region across the second gate structure; providing a first gate contact over the first gate structure, and a second gate contact over the second gate structure; and providing a diffusion contact structure between the first and second gate cut regions to couple the first gate contact to the second gate contact.

20 Claims, 7 Drawing Sheets

CROSS-COUPLING BASED DESIGN USING DIFFUSION CONTACT STRUCTURES

TECHNICAL FIELD

The present disclosure relates to cross-coupling-based designs. The present disclosure is particularly applicable to designs in 20 nanometer (nm) technology nodes and beyond.

BACKGROUND

Figure 1:
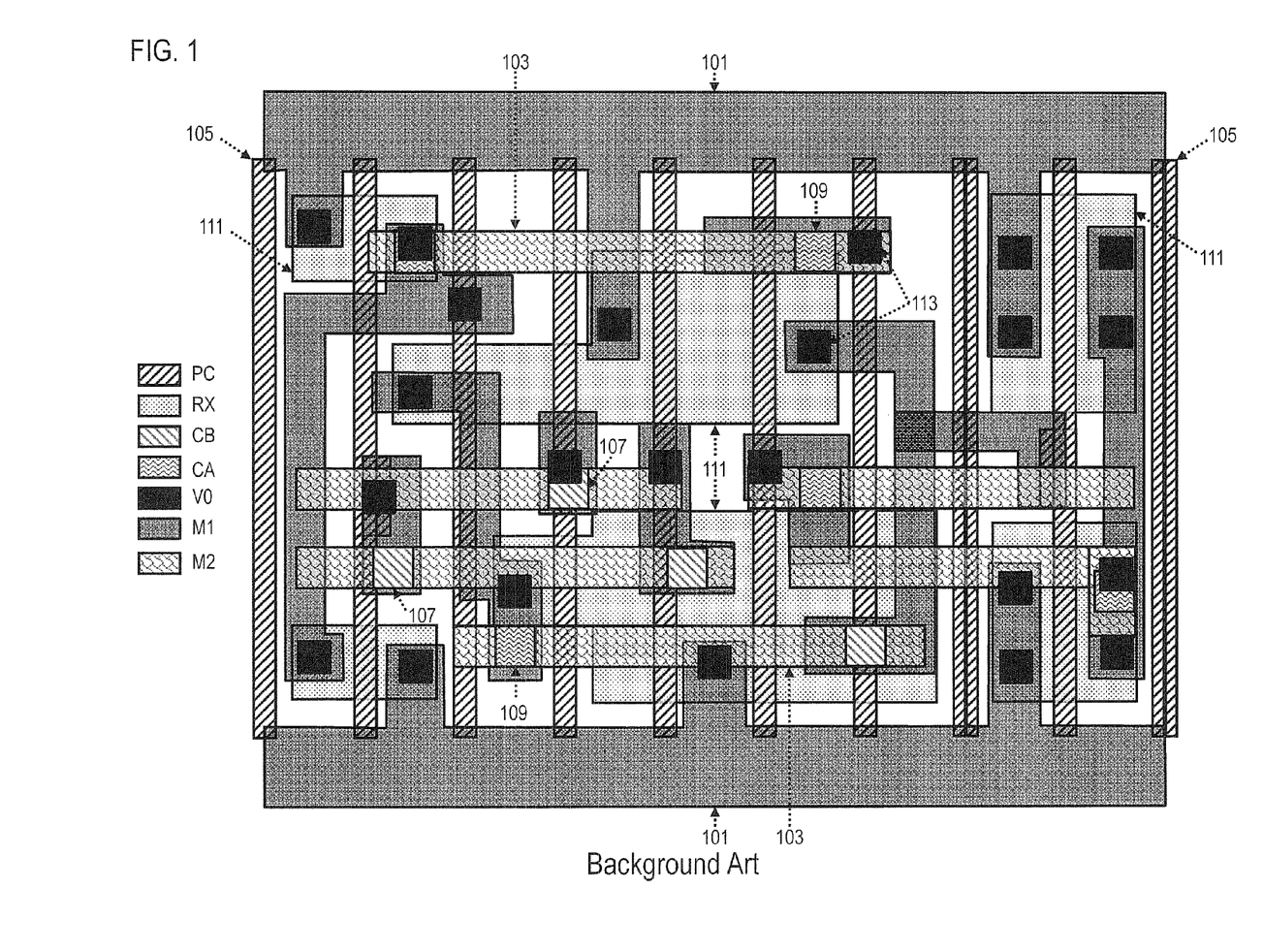
FIG. 1 schematically illustrates a cross-coupling-based multiplexer design using metal layer structures.

As technology advances, the importance of logic scaling continues to grow. However, traditional approaches to scaling of standard cells (e.g., the building blocks of logic design) are no longer effective due to lithographic limitations. In recent years, cross-coupling techniques have been implemented to mitigate the effects of such lithographic limitations to provide continued scaling of standard cells. Typical cross-coupling techniques, for instance, utilize metal layer structures to perform cross-coupling. For example, FIG. 1 schematically illustrates a cross-coupling-based multiplexer design using metal1 layer structures 101 and metal2 layer structures 103 to connect various gate structures 105, gate contacts 107, diffusion contacts 109, diffusion regions 111, and via structures 113 (e.g., via0, via1, etc.). As depicted, the cross-coupling of the multiplexer design requires three contacted poly pitches (3-CPP), causing the multiplexer design to stretch over nine gate grids (9-PC grids). Moreover, a 3-CPP-based flip-flop design (not shown for illustrative convenience) generally requires at least twenty-four gate grids (24-PC grids). To reduce cell size requirements, 2-CPP cross-coupling-based designs for multiplexers, flip-flops, and other standard cells may be implemented. However, typical 2-CPP cross-coupling-based design implementations (e.g., using trench silicide routing) are more costly, complex, and susceptible to leakage and damage to dielectric.

A need therefore exists for more effective and efficient 2-CPP cross-coupling-based designs that avoid significant increases in cost, complexity, or susceptibility to leakage and damage, and enabling methodology.

SUMMARY

An aspect of the present disclosure is a method for implementing a cross-coupling-based design using diffusion contact structures.

Another aspect of the present disclosure is a device implemented with a cross-coupling-based design using diffusion contact structures.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: providing first and second gate structures over a substrate; providing a first gate cut region across the first gate structure, and a second gate cut region across the second gate structure; providing a first gate contact over the first gate structure, and a second gate contact over the second gate structure; and providing a diffusion contact structure between the first and second gate cut regions to couple the first gate contact to the second gate contact.

Aspects of the present disclosure include providing the diffusion contact structure, the first gate cut region, and the second gate cut region within a two-gate pitch region. Some aspects include the two-gate pitch region including first, second, third, and fourth transistors. Additional aspects include: providing a first transistor gate structure of the first transistor and a second transistor gate structure of the second transistor on opposite sides of the first gate cut region; and providing a third transistor gate structure of the third transistor and a fourth transistor gate structure of the fourth transistor on opposite sides of the second gate cut region. Various aspects include the diffusion contact structure overlapping the first gate structure, the second gate structure, or a combination thereof.

Certain aspects include providing a multiplexer circuit having the first and second gate structures, the first and second gate cut regions, the first and second gate contacts, and the diffusion contact structure. Some aspects include providing a flip-flop circuit having the first and second gate structures, the first and second gate cut regions, the first and second gate contacts, and the diffusion contact structure. Further aspects include: providing third, fourth, fifth, and sixth gate structures over the substrate; providing a third gate cut region across the third gate structure, a fourth gate cut region across the fourth gate structure, a fifth gate cut region across the fifth gate structure, and a sixth gate cut region across the sixth gate structure; providing a third gate contact over the third gate structure, a fourth gate contact over the fourth gate structure, a fifth gate contact over the fifth gate structure, and a sixth gate contact over the sixth gate structure; and providing a second diffusion contact structure between the third and fourth gate cut regions to couple the third gate contact to the fourth gate contact, and a third diffusion contact structure between the fifth and sixth gate cut regions to couple the fifth gate contact to the sixth gate contact, wherein the flip-flop circuit further includes the third, fourth, fifth, and sixth gate structures, the third, fourth, fifth, and sixth gate cut regions, the third, fourth, fifth, and sixth gate contacts, and the second and third diffusion contact structures.

An additional aspect of the present disclosure is a device including: first and second gate structures over a substrate; a first gate cut region across the first gate structure, and a second gate cut region across the second gate structure; a first gate contact over the first gate structure, and a second gate contact over the second gate structure; and a diffusion contact structure between the first and second gate cut regions that couples the first gate contact to the second gate contact.

Aspects include a device having the diffusion contact structure, the first gate cut region, and the second gate cut region within a two-gate pitch region. Various aspects include the two-gate pitch region including first, second, third, and fourth transistors. Additional aspects include a device having a first transistor gate structure of the first transistor and a second transistor gate structure of the second transistor on opposite sides of the first gate cut region; and a third transistor gate structure of the third transistor and a fourth transistor gate structure of the fourth transistor on opposite sides of the second gate cut region. Other aspects include a device having the diffusion contact structure that overlaps the first gate structure, the second gate structure, or a combination thereof.

Certain aspects include a device having a multiplexer circuit that includes the first and second gate structures, the first and second gate cut regions, the first and second gate contacts, and the diffusion contact structure. Some aspects include a device having a flip-flop circuit that includes the first and second gate structures, the first and second gate cut regions, the first and second gate contacts, and the diffusion contact structure. Further aspects include a device having the flip-flop circuit that further includes: third, fourth, fifth, and sixth gate structures over the substrate; a third gate cut region across the third gate structure, a fourth gate cut region across the fourth gate structure, a fifth gate cut region across the fifth gate structure, and a sixth gate cut region across the sixth gate structure; a third gate contact over the third gate structure, a fourth gate contact over the fourth gate structure, a fifth gate contact over the fifth gate structure, and a sixth gate contact over the sixth gate structure; and a second diffusion contact structure between the third and fourth gate cut regions to couple the third gate contact to the fourth gate contact, and a third diffusion contact structure between the fifth and sixth gate cut regions to couple the fifth gate contact to the sixth gate contact.

Another aspect of the present disclosure includes: providing first and second gate structures over a substrate; providing a first gate cut region across the first gate structure, and a second gate cut region across the second gate structure; providing a first gate contact over the first gate structure, and a second gate contact over the second gate structure; providing a diffusion contact structure outside the first gate cut region, the second gate cut region, or a combination thereof; and coupling the first gate contact to the second gate contact with the diffusion contact structure.

Additional aspects include: providing the diffusion contact structure, the first gate cut region, and the second gate cut region within a two-gate pitch region, wherein the two-gate pitch region includes first, second, third, and fourth transistors. Some aspects include: providing a first transistor gate structure of the first transistor and a second transistor gate structure of the second transistor on opposite sides of the first gate cut region; and providing a third transistor gate structure of the third transistor and a fourth transistor gate structure of the fourth transistor on opposite sides of the second gate cut region. Further aspects include the diffusion contact structure overlapping the first gate structure, the second gate structure, or a combination thereof.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves problems of large cell size, high costs and complexities, and susceptibility to leakage and damage attendant upon typical cross-coupling-based designs. The present disclosure addresses and solves such problems, for instance, by, inter alia, providing a diffusion contact structure between a first gate cut region across a first gate structure and a second gate cut region across a second gate structure to couple a first gate contact over the first gate structure to a second gate contact over the second gate structure.

Figure 2:
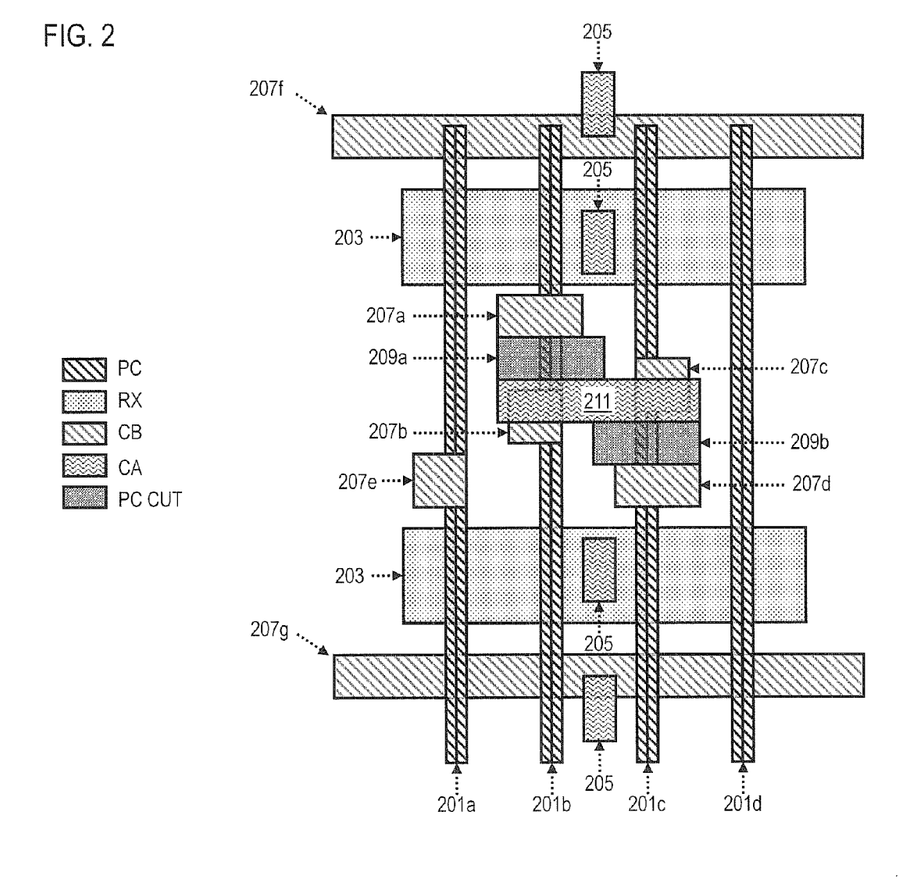
FIG. 2 schematically illustrates a cross-coupling-based design using diffusion contact structures, in accordance with an exemplary embodiment of the present disclosure.

FIG. 2 schematically illustrates a cross-coupling-based design using diffusion contact structures, in accordance with an exemplary embodiment of the present disclosure. As shown, the design in FIG. 2 includes gate structures (PC) 201a, 201b, 201c, and 201d over diffusion regions (RX) 203 having diffusion contact structures (CA) 205, along with gate contacts (CB) 207a through 207g over gate structures 201a through 201d. In addition, the design in FIG. 2 utilizes gate cut region (PC cut) 209a across gate structures 201b to separate gate contact 207a from gate contact 207b, gate cut region 209b across gate structure 201c to separate gate contact 207c from gate contact 207d, and diffusion contact structure 211 to couple gate contact 207b to gate contact 207c.

As depicted, the use of diffusion contact structure 211, gate cut regions 209a and 209b, and gate contacts 207a through 207d that are within a two-gate pitch region (e.g., 2-CPP) enable four transistors (e.g., in a transmission gate) to be connected in the tightly dense two-gate pitch region. For example, a transistor gate of the first transistor may correspond to a portion of gate structure 201b overlapping with gate contact 207a, a transistor gate of the second transistor may correspond to a portion of gate structure 201b overlapping with gate contact 207b, a transistor gate of the third transistor may correspond to a portion of gate structure 201c overlapping with gate contact 207c, and a transistor gate of the fourth transistor may correspond to a portion of gate structure 201c overlapping with gate contact 207d. Thus, by employing local gate contacts 207a-207d (CB) and diffusion contact structure 211 (CA), as well as special CA/CB handshakes, dense connections in a high-density library (e.g., 8-tracks of 64 nm of metal2 layer structures) may be provided to reduce the area required by standard cells (e.g., by at least an additional 7% compared with standard cells without these local components, CA/CB handshakes, etc.). Moreover, as indicated, embodiments of the present disclosure may provide lower costs and improved reliability, for instance, due to the absence of various process complexities that burden typical cross-coupling-based designs.

Figure 3A:
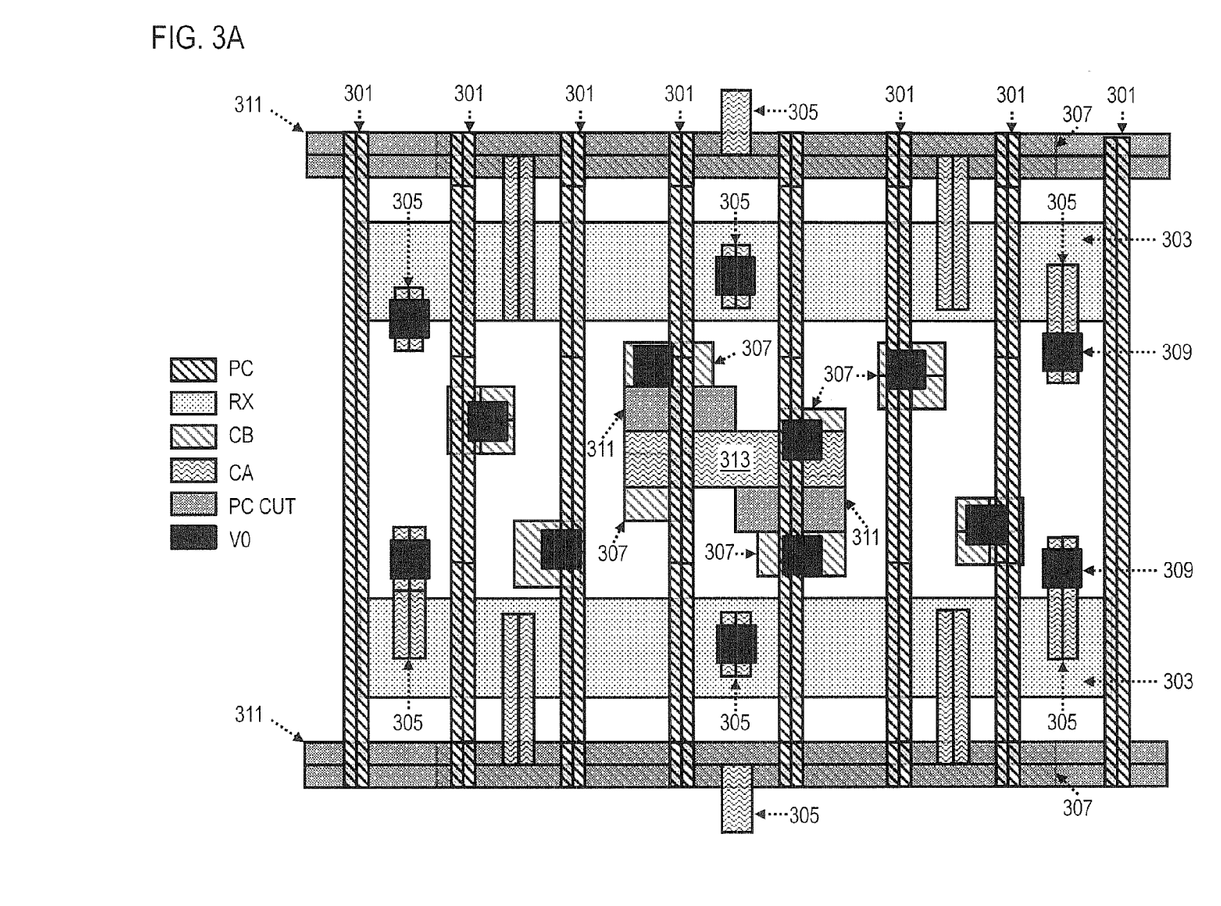
FIGS. 3A through 3C schematically illustrate various components of a cross-coupling-based multiplexer design using diffusion contact structures, in accordance with exemplary embodiments of the present disclosure.
Figure 3B:
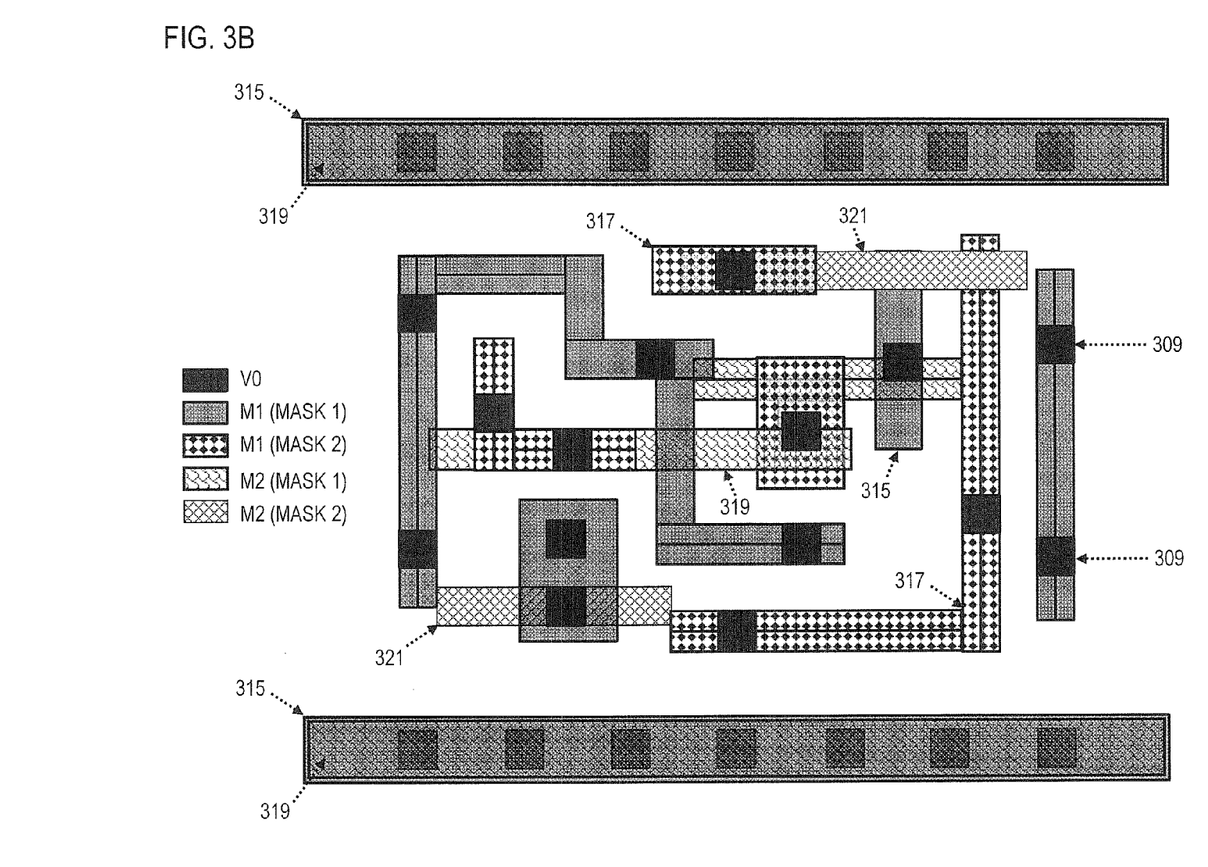
Figure 3C:
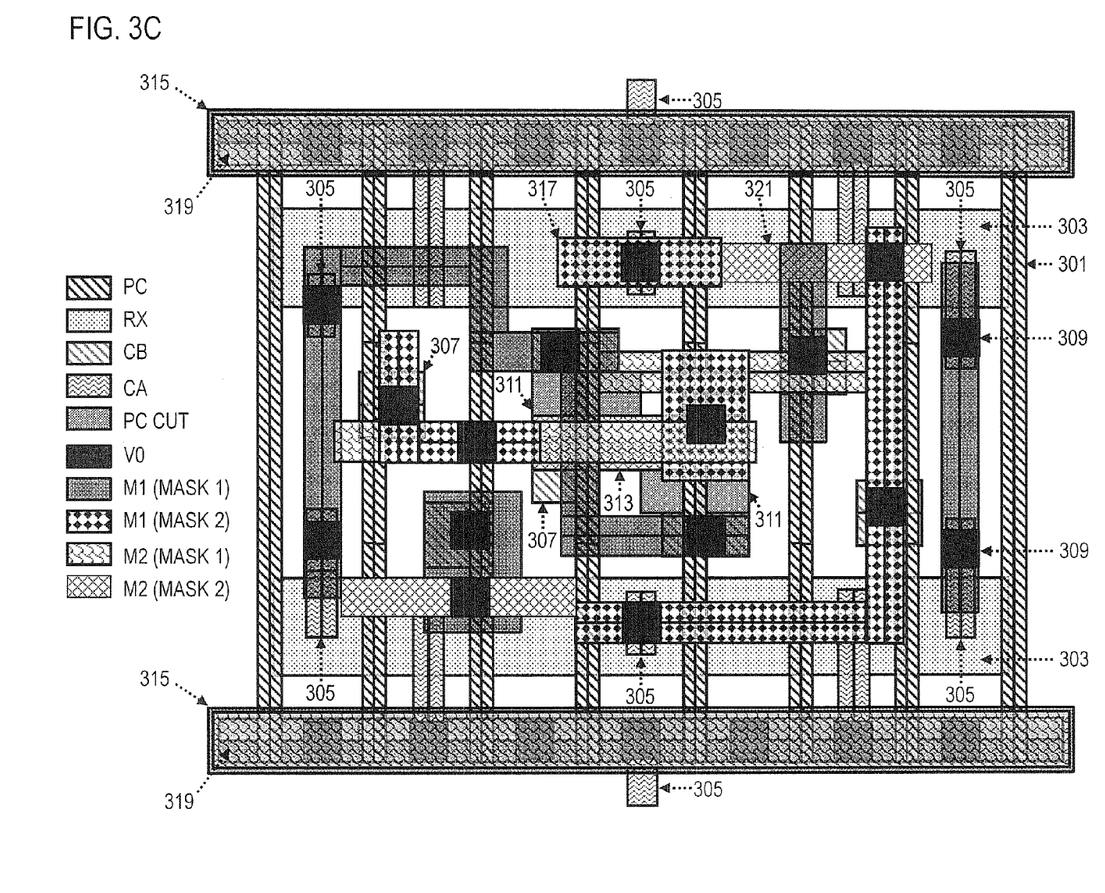

FIGS. 3A through 3C schematically illustrate various components of a cross-coupling-based multiplexer design using diffusion contact structures, in accordance with exemplary embodiments of the present disclosure. For example, FIG. 3A illustrates the multiplexer design with gate structures 301 over diffusion regions 303, diffusion contact structures 305 over diffusion regions 303, gate contacts 307 over gate structures 301, via0 structures 309 to connect lower layer components to higher layer components (e.g., on different metal layers), and gate contacts 307 overlapping with top and bottom gate cut regions 311 that stretch across the top and bottom portions of gate structures 301. As shown, the multiplexer design utilizes the cross-coupling-based design of FIG. 2. As such, the multiplexer design utilizes gate cut regions 311 to separate first and second gate contacts 307 over a first gate structure 301 from each other, and to separate third and fourth gate contacts 307 over a second gate structure 301 from each other. In addition, the multiplexer design utilizes diffusion contact structure 313 to couple one of those gate contacts 307 to another one of those gate contacts 307 (e.g., the second gate contact 307 to the third gate contact 307). In this way, the multiplexer design of FIGS. 3A through 3C stretches across only 7-PC grids, as compared with the 9-PC grid requirement associated with a typical multiplexer design (e.g., the design of FIG. 1), resulting in a reduction of the cell area necessary for standard cells with multiplexer circuits.

FIG. 3B depicts metal1 layer structures 315 and 317 (e.g., formed using different masks), metal2 layer structures 319 and 321 (e.g., formed using different masks), and via0 structures 309 that connect the lower layer components of FIG. 3A to the metal layers (via1 structures are not shown for illustrative convenience). FIG. 3C illustrates the combination of the components of FIGS. 3A and 3B. As shown, the use of the cross-coupling-based design of FIG. 2 enables the multiplexer design to include four transistors to be connected in a tightly dense two-gate pitch region (e.g., at around the center of the multiplexer design). As indicated, the use of local gate contacts 307 (CB) and diffusion contact structure 313 (CA) as well as CA/CB handshakes, and the absence of various process complexities that burden typical cross-coupling-based designs, as illustrated in FIGS. 3A through 3C, enable smaller cell size, lower costs, and improved reliability, as compared with standard cells based on typical cross-coupling-based designs.

Figure 4A:
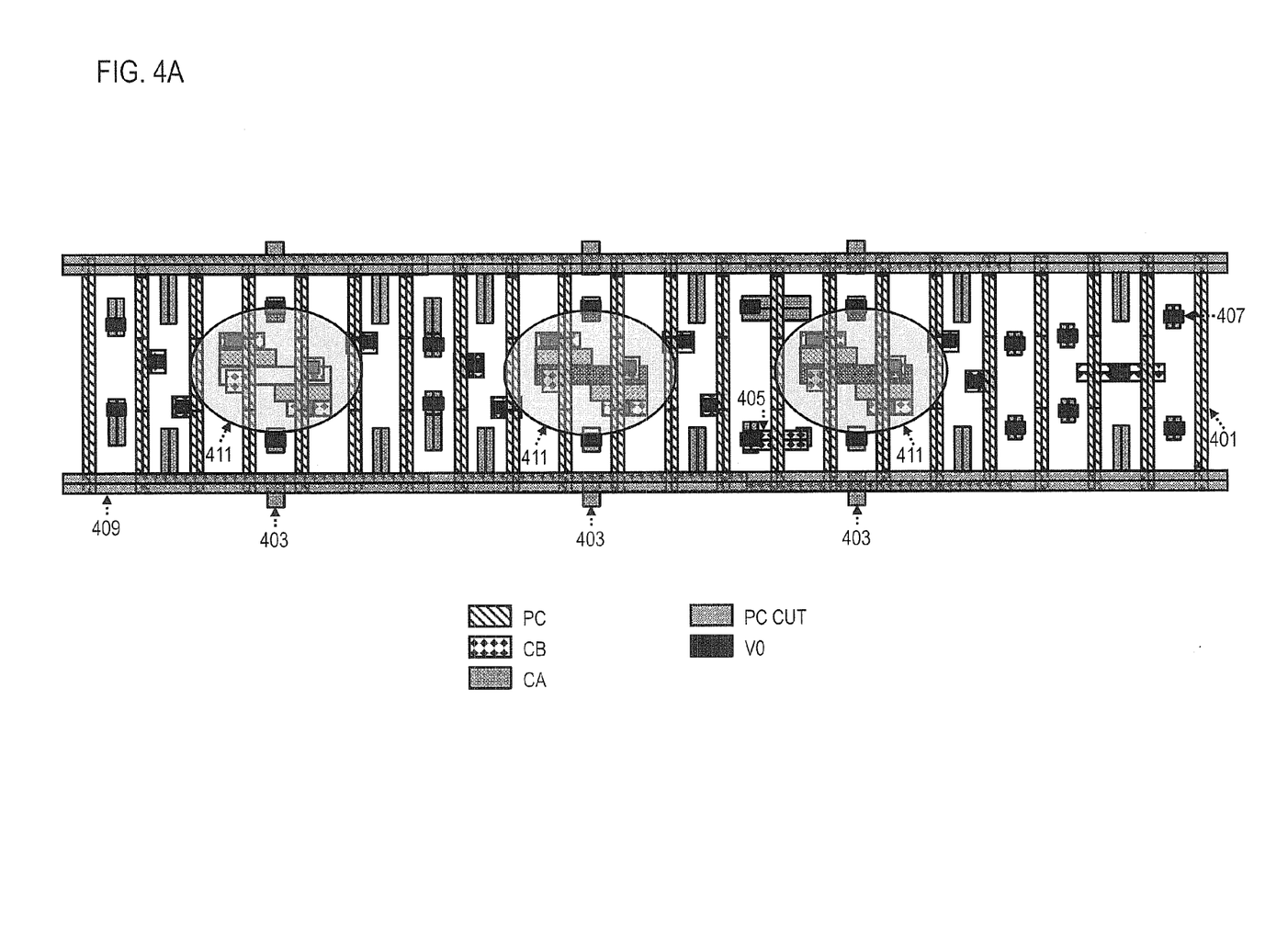
FIGS. 4A and 4B schematically illustrate various components of a cross-coupling-based flip-flop design using diffusion contact structures, in accordance with exemplary embodiments of the present disclosure.
Figure 4B:
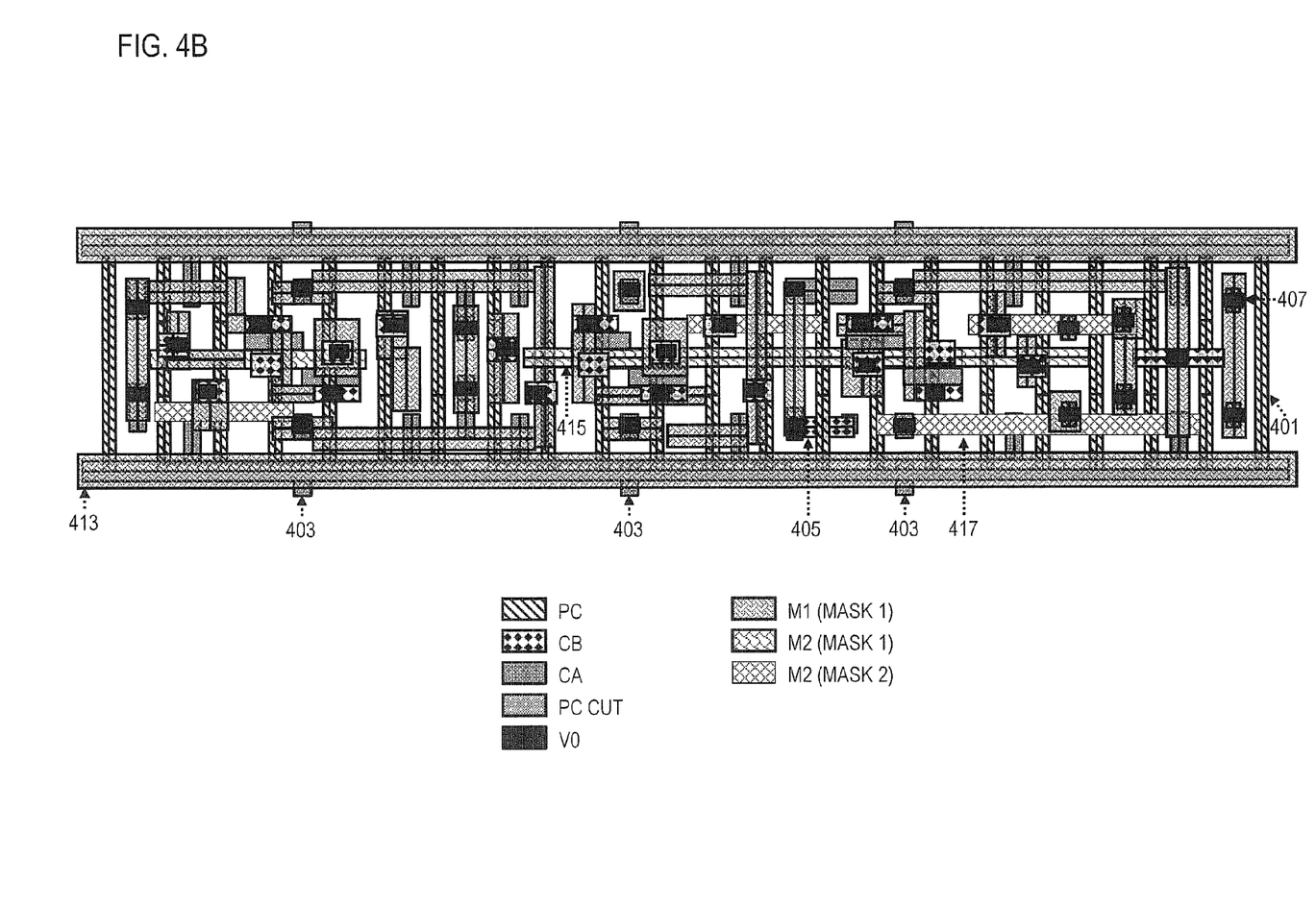

FIGS. 4A and 4B schematically illustrate various components of a cross-coupling-based flip-flop design using diffusion contact structures, in accordance with exemplary embodiments of the present disclosure. For example, FIG. 4A illustrates the flip-flop design with various gate structures 401, diffusion contact structures 403, gate contacts 405, via0 structures 407, and gate cut regions 409. As shown by indicators 411, the flop-flop design includes three two-gate pitch regions, each of which may include four transistors based on the cross-coupling design of FIG. 2. Moreover, FIG. 4B depicts the flip-flop design with metal1 layer structures 413 as well metal2 layer structures 415 and 417 in addition to the components of FIG. 4A. As discussed, typical flip-flop designs may stretch over at least 24-PC grids. On the other hand, as depicted, the flip-flop design of FIGS. 4A and 4B (based on the cross-coupling design of FIG. 2) stretches across only 21-PC grids, resulting in a reduction of the cell area necessary for standard cells with flip-flop circuits. As indicated, the use of local gate contacts 405 (CB) and diffusion contact structures 403 (CA) as well as CA/CB handshakes, and the absence of various process complexities that burden typical cross-coupling-based designs, as illustrated in FIGS. 4A and 4B, enable smaller cell size, lower costs, and improved reliability, as compared with standard cells based on typical cross-coupling-based designs.

The embodiments of the present disclosure can achieve several technical effects, including reduced cell size, lower costs, less complexity, and improved reliability. Embodiments of the present disclosure enjoy utility in various industrial applications as, for example, microprocessors, smart phones, mobile phones, cellular handsets, set-top boxes, DVD recorders and players, automotive navigation, printers and peripherals, networking and telecom equipment, gaming systems, and digital cameras. The present disclosure therefore enjoys industrial applicability in any of various types of highly integrated semiconductor devices, particularly in 20 nm technology nodes and beyond.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
   providing first and second gate structures over a substrate;
   providing a first gate cut region across the first gate structure, and a second gate cut region across the second gate structure;
   providing a first gate contact over the first gate structure, and a second gate contact over the second gate structure; and
   providing a diffusion contact structure between the first and second gate cut regions to couple the first gate contact to the second gate contact.

2. The method according to claim 1, further comprising:
   providing the diffusion contact structure, the first gate cut region, and the second gate cut region within a two-gate pitch region.

3. The method according to claim 2, wherein the two-gate pitch region includes first, second, third, and fourth transistors.

4. The method according to claim 3, further comprising:
   providing a first transistor gate structure of the first transistor and a second transistor gate structure of the second transistor on opposite sides of the first gate cut region; and
   providing a third transistor gate structure of the third transistor and a fourth transistor gate structure of the fourth transistor on opposite sides of the second gate cut region.

5. The method according to claim 1, wherein the diffusion contact structure overlaps the first gate structure, the second gate structure, or a combination thereof.

6. The method according to claim 1, further comprising:
   providing a multiplexer circuit having the first and second gate structures, the first and second gate cut regions, the first and second gate contacts, and the diffusion contact structure.

7. The method according to claim 1, further comprising:
   providing a flip-flop circuit having the first and second gate structures, the first and second gate cut regions, the first and second gate contacts, and the diffusion contact structure.

8. The method according to claim 7, further comprising:
providing third, fourth, fifth, and sixth gate structures over the substrate;
providing a third gate cut region across the third gate structure, a fourth gate cut region across the fourth gate structure, a fifth gate cut region across the fifth gate structure, and a sixth gate cut region across the sixth gate structure;
providing a third gate contact over the third gate structure, a fourth gate contact over the fourth gate structure, a fifth gate contact over the fifth gate structure, and a sixth gate contact over the sixth gate structure; and
providing a second diffusion contact structure between the third and fourth gate cut regions to couple the third gate contact to the fourth gate contact, and a third diffusion contact structure between the fifth and sixth gate cut regions to couple the fifth gate contact to the sixth gate contact,
wherein the flip-flop circuit further includes the third, fourth, fifth, and sixth gate structures, the third, fourth, fifth, and sixth gate cut regions, the third, fourth, fifth, and sixth gate contacts, and the second and third diffusion contact structures.

9. A device comprising:
first and second gate structures over a substrate;
a first gate cut region across the first gate structure, and a second gate cut region across the second gate structure;
a first gate contact over the first gate structure, and a second gate contact over the second gate structure; and
a diffusion contact structure between the first and second gate cut regions that couples the first gate contact to the second gate contact.

10. The device according to claim 9, wherein the diffusion contact structure, the first gate cut region, and the second gate cut region are within a two-gate pitch region.

11. The device according to claim 10, wherein the two-gate pitch region includes first, second, third, and fourth transistors.

12. The device according to claim 11, further comprising:
a first transistor gate structure of the first transistor and a second transistor gate structure of the second transistor on opposite sides of the first gate cut region; and
a third transistor gate structure of the third transistor and a fourth transistor gate structure of the fourth transistor on opposite sides of the second gate cut region.

13. The device according to claim 9, wherein the diffusion contact structure overlaps the first gate structure, the second gate structure, or a combination thereof.

14. The device according to claim 9, further comprising:
a multiplexer circuit having the first and second gate structures, the first and second gate cut regions, the first and second gate contacts, and the diffusion contact structure.

15. The device according to claim 9, further comprising:
a flip-flop circuit having the first and second gate structures, the first and second gate cut regions, the first and second gate contacts, and the diffusion contact structure.

16. The device according to claim 15, wherein the flip-flop circuit further includes:
third, fourth, fifth, and sixth gate structures over the substrate;
a third gate cut region across the third gate structure, a fourth gate cut region across the fourth gate structure, a fifth gate cut region across the fifth gate structure, and a sixth gate cut region across the sixth gate structure;
a third gate contact over the third gate structure, a fourth gate contact over the fourth gate structure, a fifth gate contact over the fifth gate structure, and a sixth gate contact over the sixth gate structure; and
a second diffusion contact structure between the third and fourth gate cut regions to couple the third gate contact to the fourth gate contact, and a third diffusion contact structure between the fifth and sixth gate cut regions to couple the fifth gate contact to the sixth gate contact.

17. A method comprising:
providing first and second gate structures over a substrate;
providing a first gate cut region across the first gate structure, and a second gate cut region across the second gate structure;
providing a first gate contact over the first gate structure, and a second gate contact over the second gate structure;
providing a diffusion contact structure outside the first gate cut region, the second gate cut region, or a combination thereof; and
coupling the first gate contact to the second gate contact with the diffusion contact structure.

18. The method according to claim 17, further comprising:
providing the diffusion contact structure, the first gate cut region, and the second gate cut region within a two-gate pitch region, wherein the two-gate pitch region includes first, second, third, and fourth transistors.

19. The method according to claim 18, further comprising:
providing a first transistor gate structure of the first transistor and a second transistor gate structure of the second transistor on opposite sides of the first gate cut region; and
providing a third transistor gate structure of the third transistor and a fourth transistor gate structure of the fourth transistor on opposite sides of the second gate cut region.

20. The method according to claim 17, wherein the diffusion contact structure overlaps the first gate structure, the second gate structure, or a combination thereof.

\* \* \* \* \*